US009240705B2

(12) United States Patent
Fumamoto et al.

(10) Patent No.: US 9,240,705 B2
(45) Date of Patent: Jan. 19, 2016

(54) CONTROL APPARATUS AND CONTROL METHOD

(75) Inventors: Akihiro Fumamoto, Kyoto (JP); Akira Enami, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 645 days.

(21) Appl. No.: 13/579,678

(22) PCT Filed: Apr. 1, 2011

(86) PCT No.: PCT/JP2011/058462
§ 371 (c)(1),
(2), (4) Date: Oct. 23, 2012

(87) PCT Pub. No.: WO2011/125954
PCT Pub. Date: Oct. 13, 2011

(65) Prior Publication Data
US 2013/0049464 A1 Feb. 28, 2013

(30) Foreign Application Priority Data

Apr. 2, 2010 (JP) .................................. 2010-086480
Mar. 15, 2011 (JP) .................................. 2011-056956

(51) Int. Cl.
*H02J 3/14* (2006.01)
*H02J 7/35* (2006.01)
(Continued)

(52) U.S. Cl.
CPC ................ *H02J 7/35* (2013.01); *H01M 10/44* (2013.01); *H01M 10/48* (2013.01); *H02J 3/383* (2013.01); *Y02B 10/14* (2013.01); *Y02E 10/563* (2013.01); *Y02E 10/566* (2013.01); *Y10T 307/352* (2015.04); *Y10T 307/406* (2015.04)

(58) Field of Classification Search
CPC ....... H01M 10/44; H01M 10/48; H02J 3/383; H02J 7/35; Y02E 10/563; Y02E 10/566; Y02B 10/14

USPC ...................................................... 307/24, 31
See application file for complete search history.

(56) References Cited

U.S. PATENT DOCUMENTS

2002/0067628 A1* 6/2002 Takehara et al. ................. 363/95
2005/0198963 A1* 9/2005 Wai et al. ......................... 60/698
(Continued)

FOREIGN PATENT DOCUMENTS

JP 2002-171674 A 6/2002
JP 3656556 B2 6/2005
(Continued)

OTHER PUBLICATIONS

European Search Report issued Nov. 27, 2013 for Application No. 11765854.2. (5 pages).
(Continued)

*Primary Examiner* — Jared Fureman
*Assistant Examiner* — Esayas Yeshaw
(74) *Attorney, Agent, or Firm* — Nutter McClennen & Fish LLP; John J. Penny, Jr.

(57) ABSTRACT

The present invention relates to a control apparatus and a control method which is capable of reliably preventing electric power not required to be returned to an electric power system from flowing out to the electric power system. A bidirectional DCAC converting unit converts DC power stored in a storage battery to AC power, and outputs the converted power to each load. Further, a current detecting unit is arranged on a wire from the electric power system which is connected to a wire between the bidirectional DCAC converting unit and each load, and the current detecting unit detects a current flowing between the connection point and the electric power system. A control unit increases/reduces an amount of AC power output of the bidirectional DCAC converting unit based on an amount of current detected by the current detecting unit, thereby to control a supply of electric power to each load.

8 Claims, 6 Drawing Sheets

(51) Int. Cl.
   *H01M 10/44* (2006.01)
   *H01M 10/48* (2006.01)
   *H02J 3/38* (2006.01)

(56) References Cited

U.S. PATENT DOCUMENTS

| | | | |
|---|---|---|---|
| 2007/0177338 A1* | 8/2007 | Nishi et al. | 361/641 |
| 2010/0096927 A1* | 4/2010 | Miyauchi et al. | 307/64 |
| 2010/0231045 A1* | 9/2010 | Collins et al. | 307/47 |

FOREIGN PATENT DOCUMENTS

| | | |
|---|---|---|
| JP | 2005-237121 A | 9/2005 |
| JP | 2007-209133 A | 8/2007 |

OTHER PUBLICATIONS

International Search Report for Application No. PCT/JP2011/058462, mailed Jun. 28, 2011.

* cited by examiner

CONTROL APPARATUS AND CONTROL METHOD

TECHNICAL FIELD

The present invention relates to a control apparatus and a control method, and particularly relates to a control apparatus and a control method which are capable of realizing a distinction between electric power wished to be fed into an electric power system and electric power not required to be fed into the electric power system in the case when such a distinction is required.

BACKGROUND ART

In these days, a house is being developed which not only purchases electric power from a commercial electric power system, but also utilizes electric power generated by a photovoltaic panel, a small-sized aerogenerator, a fuel cell or the like provided in the house.

In a conventional home electric power system provided with the photovoltaic panel, electric power generated in the photovoltaic panel is converted to AC power by a power conditioner, and thereafter supplied to each domestic load or returned to the commercial electric power system via a distribution board that branches electric power from the commercial electric power system.

The conventional home electric power system will be described with reference to FIG. 6, for example.

In a home electric power system 101 shown in FIG. 6, electric power is supplied from an electric power network (electric power system) as the commercial electric power system to a distribution board 113 via a meter 112. Electric power supplied from the electric power system to the distribution board 113 is branched into breakers 123-1 to 123-6 via a safety breaker (SB) 121 and an earth leakage circuit breaker (ELB) 122, and supplied to each load such as a home electric appliance via a wall outlet, not shown, or the like.

Further, electric power generated in a photovoltaic panel 114, which is supplied to a power conditioner 116, is inputted into a DCAC (DC-AC) converting unit 132 via a PV (Photo-Voltanic) control unit 131, and is converted to AC power in the DCAC converting unit 132. An output-side terminal of the DCAC converting unit 132 is connected to a wire between the safety breaker 121 and the earth leakage circuit breaker 122 of the distribution board 113, and the electric power outputted from the DCAC converting unit 132 is supplied to the distribution board 113.

In such a home electric power system 101, the distribution board 113 and a power conditioner 116 are connected by a set of wires, and the electric power generated in the photovoltaic panel 114 is supplied to each domestic load and consumed, or returned to the electric power system and sold, via the distribution board 113.

Incidentally, with the aim of diffusion of photovoltaic power generation, there has been considered in each country the introduction of a system to purchase photovoltaically generated electric power at a higher price as compared with electric power other than that. In such an electric power trading system, electric power generated in the photovoltaic panel is allowed to be returned to the electric power system, but some of electric power from power sources other than the electric power generated in the photovoltaic panel is not allowed to be returned to the electric power system.

For this reason, there is, for example, proposed a power-conditioner control apparatus having a function to sense electric power generated in a gas cogeneration system and prevent the electric power from flowing out to the electric power system (e.g., Patent Document 1).

PRIOR ART DOCUMENT

Patent Document

Patent Document 1: Japanese Patent No. 3656556

SUMMARY OF THE INVENTION

Problems to be Solved by the Invention

Incidentally, other than the electric power by means of the gas cogeneration which is disclosed in Patent Document 1, for example, electric power stored in a storage battery may not be returned to the electric power system. Hence, it is necessary to reliably prevent electric power not required to be returned to the electric power system (electric power from the gas cogeneration, the storage battery, and the like) from flowing out to the electric power system. Further, there has been sought a control apparatus for a power-conditioner which is configured so as to be able to make a clear distinction between the electric power generated in the photovoltaic panel and electric power other than that, and readily recognize that the electric power not required to be returned to the electric power system is reliably being prevented from flowing out to the electric power system.

The present invention was made in view of such a situation, and makes it possible to reliably prevent the electric power not required to be returned to the electric power system from flowing out to the electric power system, and readily recognize the prevention.

Means for Solving the Problem

A control apparatus of the present invention includes: a first electric power converting unit configured to convert DC power to AC power and output the converted power to each load; a first current detecting unit configured to detect a current flowing between a connection point and an electric power system, the connection point being where a wire from the electric power system is connected to a wire between the first electric power converting unit and the each load; and a control unit configured to control a supply of the electric power from the first electric power converting unit to the each load based on an amount of current detected by the first current detecting unit.

In such a configuration, the wire from the electric power system is connected to the wire between the first electric power converting unit and each load, and a current flowing between the connection point and the electric power system is detected by the first current detecting unit, and based on an amount of current, the supply of the electric power outputted to each load is controlled, whereby it is possible to reliably prevent electric power not required to be returned to the electric power system from flowing out to the electric power system.

Moreover, the control apparatus of the present invention can further include a second electric power converting unit configured to convert DC power to AC power, the control apparatus being characterized in that the second electric power converting unit is connected to the electric power system, and also connected to a wire between the first electric power converting unit and each load via the first current detecting unit, and the first current detecting unit detects a current flowing through a wire connecting the wire between the electric power system and the second electric power converting unit with the wire between the first electric power converting unit and each load.

In such a configuration, the second electric power converting unit is connected to the electric power system, and also connected to the wire between the first electric power converting unit and each load via the first current detecting unit, and the first current detecting unit detects the current flowing through the wire connecting the wire between the electric power system and the second electric power converting unit with the wire between the first electric power converting means and each load, whereby it is possible to return an output from the second electric power converting unit to the electric power system, and also to reliably prevent an output from the first current detecting unit from flowing out, so as to readily recognize the prevention.

A control method of the present invention is a control method for a control apparatus which adjusts a supply of electric power in an electric power system, the control apparatus including an electric power converting unit configured to convert DC power to AC power and outputting the converted power to each load, and a current detecting unit configured to detect a current flowing between a connection point and an electric power system, the connection point being where a wire from the electric power system is connected to a wire between the electric power converting unit and each load, the method including the steps of: acquiring an amount of current detected by the current detecting unit; and controlling a supply of the electric power from the electric power converting unit to each load based on the amount of current.

In such a configuration, the amount of current detected by the current detecting unit is acquired, and based on the amount of current, the supply of the electric power from the electric power converting unit to each load is controlled, whereby it is possible to reliably prevent electric power not required to be returned to the electric power system from flowing out to the electric power system.

Effect of the Invention

According to a control apparatus and a control method of the present invention, it is possible to reliably prevent electric power not required to be returned to an electric power system from flowing out to an electric power system, and reliably recognize the prevention.

BEST MODE FOR CARRYING OUT THE INVENTION

Hereinafter, a specific embodiment, to which the present invention has applied, will be described in detail with reference to the drawings.

Figure 1:
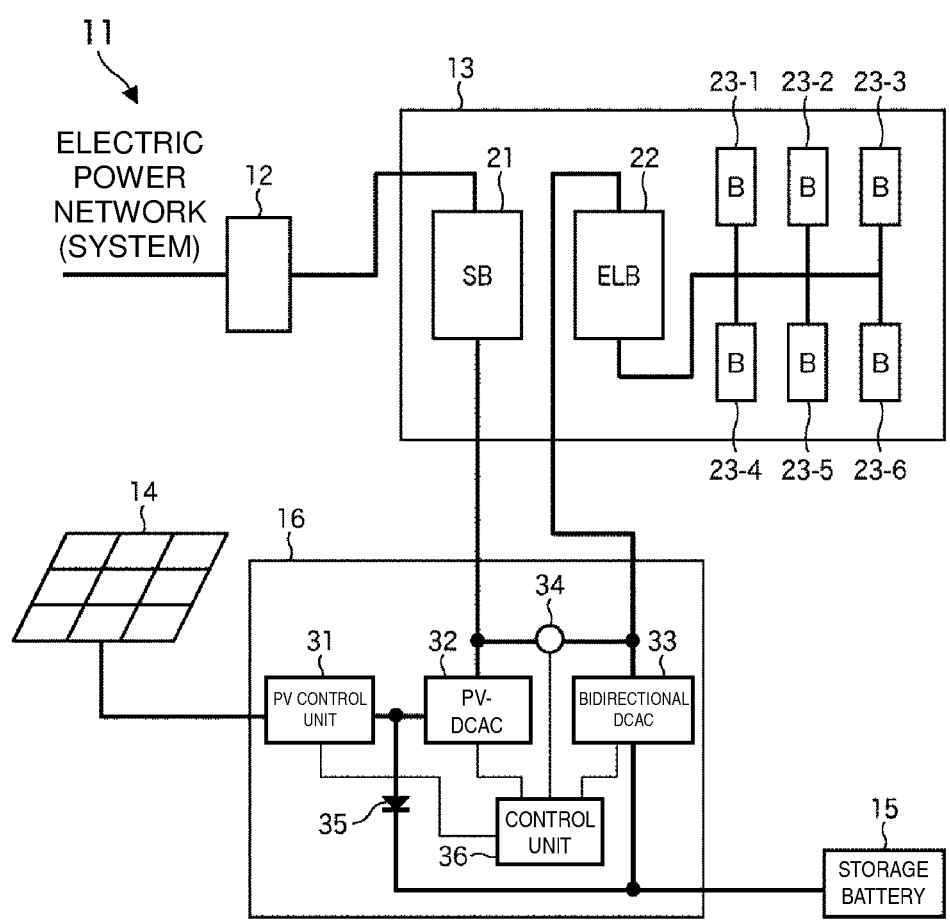
FIG. 1 is a block diagram showing an example of a configuration of a first embodiment of a home electric power system, to which the present invention has been applied.

FIG. 1 is a block diagram showing an example of a configuration of a first embodiment of a home electric power system, to which the present invention has been applied. It is to be noted that in the present specification, the system refers to the whole apparatus including a plurality of devices.

In FIG. 1, a home electric power system 11 is configured to include a meter 12, a distribution board 13, a photovoltaic panel 14, a storage battery 15, and a power conditioner 16.

The meter 12 is connected to an electric power network (electric power system) that supplies electric power from a commercial power source, and has a measurement unit (for purchasing electric power) that measures an amount of electric power to be supplied to the distribution board 13 via the meter 12, and a measurement unit (for selling electric power) that measures an amount of electric power to be returned to the electric power system. It is to be noted that, for example, the meter 12 may have one measurement unit capable of measuring the amounts of the electric power for purchasing electric power and selling electric power.

The distribution board 13 is configured to include a safety breaker 21, an earth leakage circuit breaker 22 and six breakers 23-1 to 23-6, and branches electric power into each place.

In the distribution board 13, a wire connected to the electric power system via the meter 12 is connected to one end of the safety breaker 21, and the other end of the safety breaker 21 is connected to the power conditioner 16. Further, a wire from the power conditioner 16 is connected to one end of the leakage circuit breaker 22, and the other end of the leakage circuit breaker 22 is branched into a plurality of (six in the example of FIG. 1) portions and respectively connected to the breakers 23-1 to 23-6. The breakers 23-1 to 23-6 are each connected with a domestic load via a wall outlet (not shown). It is to be noted that this load may be any load so long as being an appliance that consumes electric power, such as an air conditioner or a television set.

The safety breaker 21 is a breaker that breaks supplies of electric power to all the loads connected to the home electric power system 11 when a current not smaller than a predefined current value flows due to an overload, a short circuit, or the like. The earth leakage circuit breaker 22 is a breaker that detects an earth leakage and breaks a supply of electric power. The breakers 23-1 to 23-6 are breakers each of which breaks a supply of electric power to each load connected thereto when a current not smaller than a predefined current value flows due to an overload, a short circuit, or the like.

The photovoltaic panel 14 is a panel having a plurality of solar battery modules connected to one another, and generates electric power in accordance with an amount of irradiation with sunlight. The storage battery 15 stores electric power supplied from the electric power system and electric power generated by the photovoltaic panel 14.

The power conditioner 16 is a control apparatus configured to include a PV control unit 31, a PV-DCAC converting unit 32, a bidirectional DCAC converting unit 33, a current detecting unit 34, a diode 35, and a control unit 36, and to adjust outputs of the photovoltaic panel 14 and the storage battery 15.

In the power conditioner 16, a wire from the photovoltaic panel 14 is connected to an input end of the PV-DCAC converting unit 32 via the PV control unit 31. Further, a wire between the PV control unit 31 and the PV-DCAC converting unit 32 is connected to the storage battery 15 via the diode 35, and a wire between the diode 35 and the storage battery 15 is connected to one end of the bidirectional DCAC converting unit 33. Moreover, while an output end of the PV-DCAC converting unit 32 is connected to the safety breaker 21, the other end of the bidirectional DCAC converting unit 33 is connected to the earth leakage circuit breaker 22, and a wire between the PV-DCAC converting unit 32 and the safety breaker 21 is connected with a wire between the bidirectional DCAC converting unit 33 and the earth leakage circuit breaker 22 via the current detecting unit 34.

Figure 6:
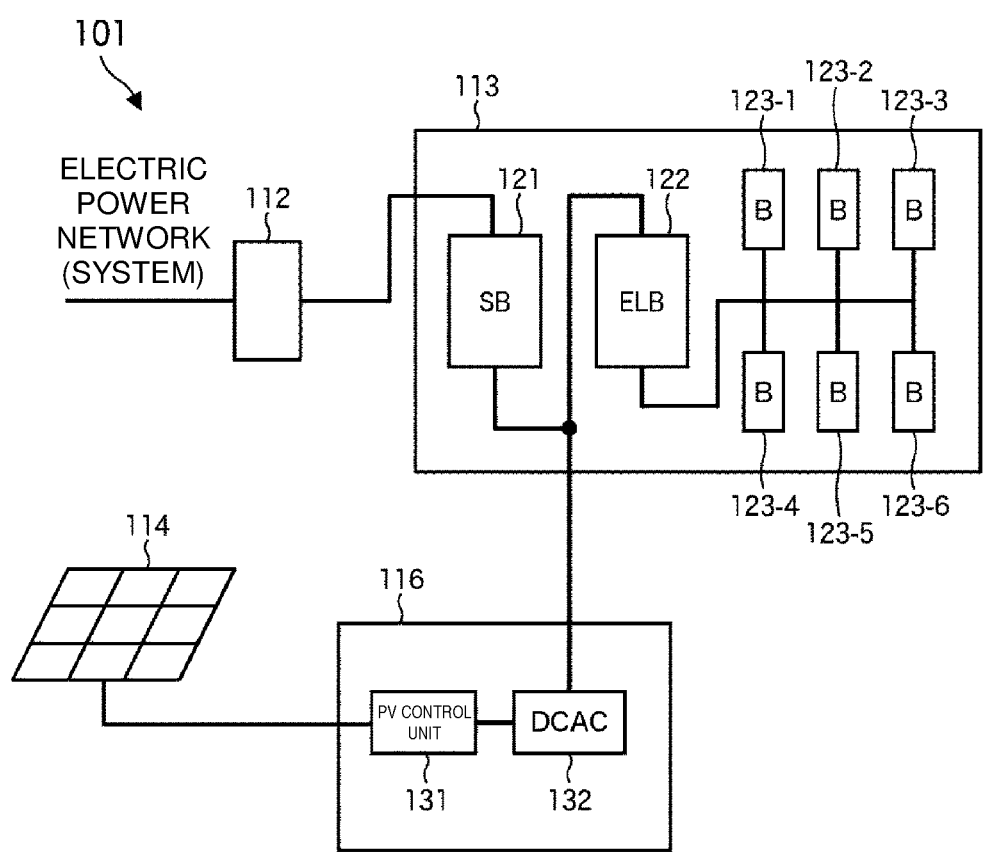
FIG. 6 is a block diagram showing an example of a configuration of a conventional home electric power system.

In other words, in the home electric power system 101 described with reference to FIG. 6, the safety breaker 121 is directly connected with the earth leakage circuit breaker 122. On the other hand, in the home electric power system 11, while the wire from the electric power system is drawn into the power conditioner 16 via the safety breaker 21 of the distribution board 13, the wire to each load is connected from the power conditioner 16 to the earth leakage circuit breaker 22 of the distribution board 13. That is, the distribution board 13 is connected with the power conditioner 16 by two sets of wires, to make a distinction between electric power from the photovoltaic panel 14 and electric power from the storage battery 15. The safety breaker 21 is connected with the earth leakage circuit breaker 22 via the current detecting unit 34 of the power conditioner 16.

Further, the PV-DCAC converting unit 32, the bidirectional DCAC converting unit 33, and the current detecting unit 34 are respectively connected to the control unit 36 by wires for control.

The PV control unit 31 controls an output of the photovoltaic panel 14 based, for example, on MPPT (Maximum Power Point Tracking) control. Further, the PV control unit 31 detects an amount of electric power generated by the photovoltaic panel 14, and a signal indicating the amount of electric power generated is supplied to the control unit 36. The PV-DCAC converting unit 32 converts DC power, generated by the photovoltaic panel 14 and supplied via the PV control unit 31, to AC power and outputs the converted power in accordance with control of the control unit 36.

The bidirectional DCAC converting unit 33 converts inputted DC power to AC power and outputs the converted power, or converts inputted AC power to DC power and outputs the converted power, in accordance with control of the control unit 36. For example, the bidirectional DCAC converting unit 33 converts DC power, inputted from the storage battery 15, to AC power and supplies the converted power to each load via the distribution board 13, or converts AC power, inputted from the electric power system, to DC power and supplies the converted power to the storage battery 15.

The current detecting unit 34 detects a flow rate of a current flowing through an arranged wire, and supplies the control unit 36 with a signal indicating the amount of current. The diode 35 is a regulation mechanism configured to prevent flowing of electric power from the storage battery 15 into the PV-DCAC converting unit 32, while supplying electric power from the photovoltaic panel 14 to the storage battery 15.

The control unit 36 controls the electric power output from the PV-DCAC converting unit 32 and the bidirectional DCAC converting unit 33 in accordance with the signal indicating the amount of the generated electric power from the PV control unit 31, the signal indicating the amount of current from the current detecting unit 34, or the like.

Figure 2:
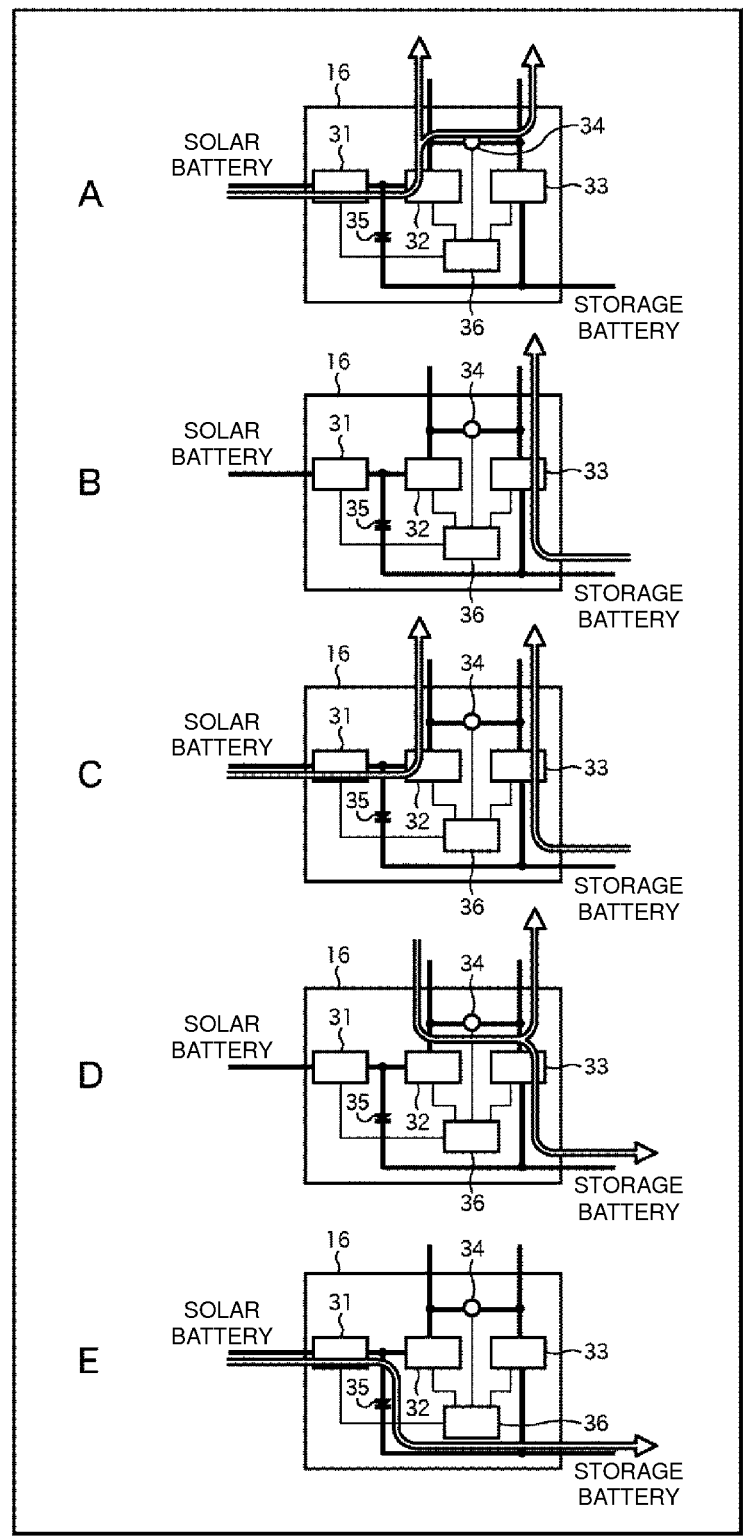
FIG. 2 is a diagram illustrating control by a control unit of FIG. 1.

For example, as shown in A of FIG. 2, when electric power generation is being performed by the photovoltaic panel 14, the control unit 36 makes the PV-DCAC converting unit 32 convert DC power from the photovoltaic panel 14, and supplies the converted power to each domestic load via the safety breaker 21 and the breakers 23-1 to 23-6. Further, when the amount of electric power generated by the photovoltaic panel 14 exceeds electric power consumption of each domestic load, surplus electric power is returned to the electric power system via the safety breaker 21 and the meter 12.

Further, as shown in B of FIG. 2, in the case of using electric power stored in the storage battery 15, the control unit 36 adjusts an output of the bidirectional DCAC converting unit 33 in accordance with the amount of current detected by the current detecting unit 34 such that no current flows towards the safety breaker 21 from the bidirectional DCAC converting unit 33.

Specifically, the control unit 36 samples (acquires) an amount of current detected by the current detecting unit 34 in accordance with a predetermined clock frequency. Then, the control unit 36 determines whether or not the amount of current flowing towards the earth leakage circuit breaker 22 from the safety breaker 21 has decreased and become 0. When it is determined that the amount of current flowing towards the earth leakage circuit breaker 22 from the safety breaker 21 has decreased and become 0, the control unit 36 reduces the output (cuts the output) of the bidirectional DCAC converting unit 33. Hence, it is possible to prevent the current from flowing towards the safety breaker 21 from the bidirectional DCAC converting unit 33. It is to be noted that, other than performing control based on whether or not the amount of current flowing towards the earth leakage circuit breaker 22 from the safety breaker 21 has decreased and become 0, the control unit 36 may perform control based on whether or not the amount of current has become not higher than a predefined amount of current which is close to 0 (whether or not it has gotten close to 0) in order to more reliably prevent the electric power from flowing out to the electric power system.

In addition, for example, when a demand for electric power by the domestic load rises to cause an increase in the amount of current flowing towards the earth leakage circuit breaker 22 from the safety breaker 21 (amount of current of electric power supplied from the electric power system) and is then detected, the control unit 36 increases the output within a range of a rated output of the bidirectional DCAC converting unit 33. In this case, the control unit 36 also controls the output of the bidirectional DCAC converting unit 33 based on the amount of current detected by the current detecting unit 34 such that there is no electric power to be returned to the electric power system.

Further, as shown in C of FIG. 2, when electric power stored in the storage battery 15 is used while the electric power generation is performed by the photovoltaic panel 14, the control unit 36 controls the output of the bidirectional DCAC converting unit 33 such that the amount of current detected by the current detecting unit 34 is held at 0. In other words, in this case, the amount of electric power generated by the photovoltaic panel 14 has been surplus electric power, and consumption by the domestic load is covered by the electric power stored in the storage battery 15, and the electric power generated by the photovoltaic panel 14 is all sold. Therefore, in this case, the control unit 36 controls electric power conversion by the bidirectional DCAC converting unit 33 such that the electric power to be used by the load matches the electric power to be outputted from the bidirectional DCAC converting unit 33.

For example, the control unit 36 performs feedback control on the output of the bidirectional DCAC converting unit 33 such that the amount of current detected by the current detecting unit 34 is the predefined amount of current which is close to 0 (the amount of current in a direction of flowing in from the electric power system).

That is, for example, when an air conditioner is activated and a demand for electric power increases in a home consumption structure, the amount of current detected by the current detecting unit 34 is smaller than a predefined amount of current as a target for the feedback control. In this case, the control unit 36 performs control such that the output of the bidirectional DCAC converting unit 33 is increased based on the amount of current detected by the current detecting unit 34, to make the detected amount of current become the predefined amount of current which is the target for the feedback control. On the other hand, for example, when the weather is fine to cause an increase in the amount of electric power generated by the photovoltaic panel 14, the amount of current detected by the current detecting unit 34 is not smaller than the predefined amount of current as the target for the feedback control. In this case, the control unit 36 performs control such that the output of the bidirectional DCAC converting unit 33 is reduced based on the amount of current detected by the current detecting unit 34, to make the detected amount of current become the predefined amount of current which is the target for the feedback control. By such feedback control, it is possible to prevent the electric power from returning to the electric power system.

Moreover, as shown in D of FIG. 2, when the electric power generated by the photovoltaic panel 14 is not performed, the control unit 36 performs control such that, while electric power from the electric power system is supplied to each domestic load, ACDC conversion is performed by the bidirectional DCAC converting unit 33, and electric power is stored into the storage battery 15. For example, in the home electric power system 11, the storage battery 15 is charged through use of electric power in the midnight.

It is to be noted that, as shown in E of FIG. 2, when the electric power generated by the photovoltaic panel 14 is used just for charging the storage battery 15, the electric power outputted from the photovoltaic panel 14 is supplied from the PV control unit 31 to the storage battery 15 via the diode 35. That is, when the electric power outputted from the photovoltaic panel 14 is neither supplied to each load via the distribution board 13 nor returned to the electric power system, the control unit 36 performs control such that the electric power conversion by the PV-DCAC converting unit 32 and the bidirectional DCAC converting unit 33 is stopped, and the storage battery 15 is charged with the electric power generated by the photovoltaic panel 14.

As thus described, in the home electric power system 11, the control unit 36 controls each unit of the power conditioner 16 in accordance with the amount of current detected by the current detecting unit 34, thereby allowing reliably prevention of the electric power stored in the storage battery 15 from flowing out to the electric power system via the safety breaker 21 and the meter 12.

In other words, the control unit 36 can perform control such that a current constantly flows in a given direction along the wire where the current detecting unit 34 is provided from the wire between the safety breaker 21 and the PV-DCAC converting unit 32 toward the wire between the earth leakage circuit breaker 22 and the bidirectional DCAC converting unit 33.

Further, in the home electric power system 11, since a distinction has been made between the wire for electric power from the photovoltaic panel 14 and the wire for electric power from the storage battery 15, it is possible to readily recognize reliable prevention of the electric power stored in the storage battery 15 from flowing out to the electric power system. Accordingly, the home electric power system 11 is effective as evidence in such a case where electric power is not required to be returned to the electric power system.

Moreover, in the home electric power system 11 provided with a plurality of electric power sources such as the photovoltaic panel 14 and the storage battery 15, it is possible to perform optimum control only by the power conditioner 16 without the need for providing control mechanisms in each of the sources, so as to make the system simple and compact. It is to be noted that the distribution board 13 can be integrally configured with the power conditioner 16.

In addition, other than the connection method for connecting the power conditioner 16 between the safety breaker 21 and the earth leakage circuit breaker 22 as shown in FIG. 1, the distribution board 13 is connected with the power conditioner 16 by, for example, connecting the power conditioner 16 between the earth leakage circuit breaker 22 and the breakers 23-1 to 23-6, or some other connection methods can also be adopted. Moreover, the configuration of the distribution board 13 is also not restricted to the configuration as shown in FIG. 1. That is, any configuration may be formed so long as a wire is drawn from the electric power system into the power conditioner 16 via the distribution board 13 and wiring from the power conditioner 16 to each load is performed from the power conditioner 16 via the distribution board 13.

Figure 3:
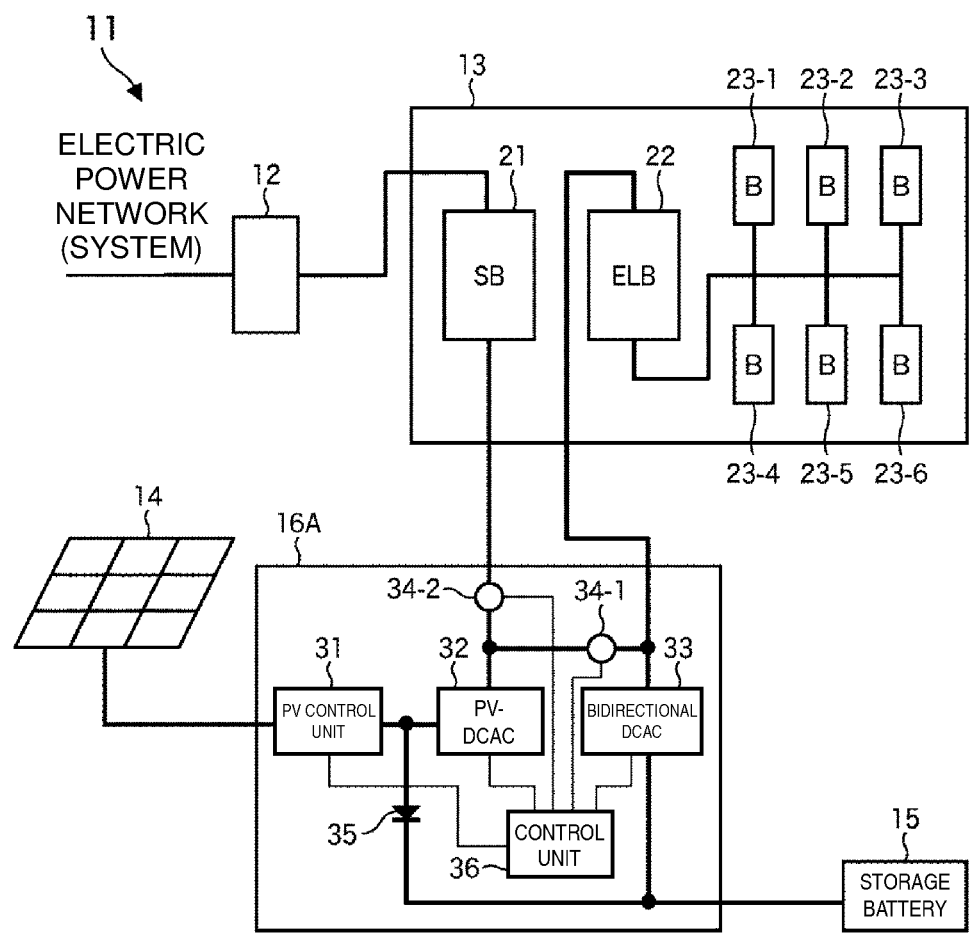
FIG. 3 is a block diagram showing an example of a configuration of a second embodiment of the home electric power system, to which the present invention has been applied.

FIG. 3 is a block diagram showing an example of a configuration of a second embodiment of the home electric power system, to which the present invention has been applied.

In the home electric power system 11 shown in FIG. 3, a power conditioner 16A is different from the power conditioner 16 of FIG. 1 as the power conditioner 16A is provided with two current detecting units 34-1 and 34-2, and is common therewith in other aspects.

It is to be noted that in the power conditioner 16A, the blocks in common with the power conditioner 16 of FIG. 1 are provided with the same numerals, and detailed descriptions thereof will be omitted.

The power conditioner 16A is provided with the current detecting unit 34-2 in addition to the current detecting unit 34-1 corresponding to the current detecting unit 34 of FIG. 1. The current detecting unit 34-2 is arranged closer to the safety breaker 21 than a connection point in which a wire where the current detecting unit 34-1 is provided is connected to the wire between the safety breaker 21 and the PV-DCAC converting unit 32.

The control unit 36 performs control, for example, such that an amount of current detected by the current detecting unit 34-2 is held at 0 in the case of preventing electric power from being purchased from the electric power system. That is, in this case, the control unit 36 controls electric power conversion of the PV-DCAC converting unit 32 and the bidirectional DCAC converting unit 33 such that the electric power to be used by the load matches the electric power to be outputted from the PV-DCAC converting unit 32 and the bidirectional DCAC converting unit 33.

Figure 4:
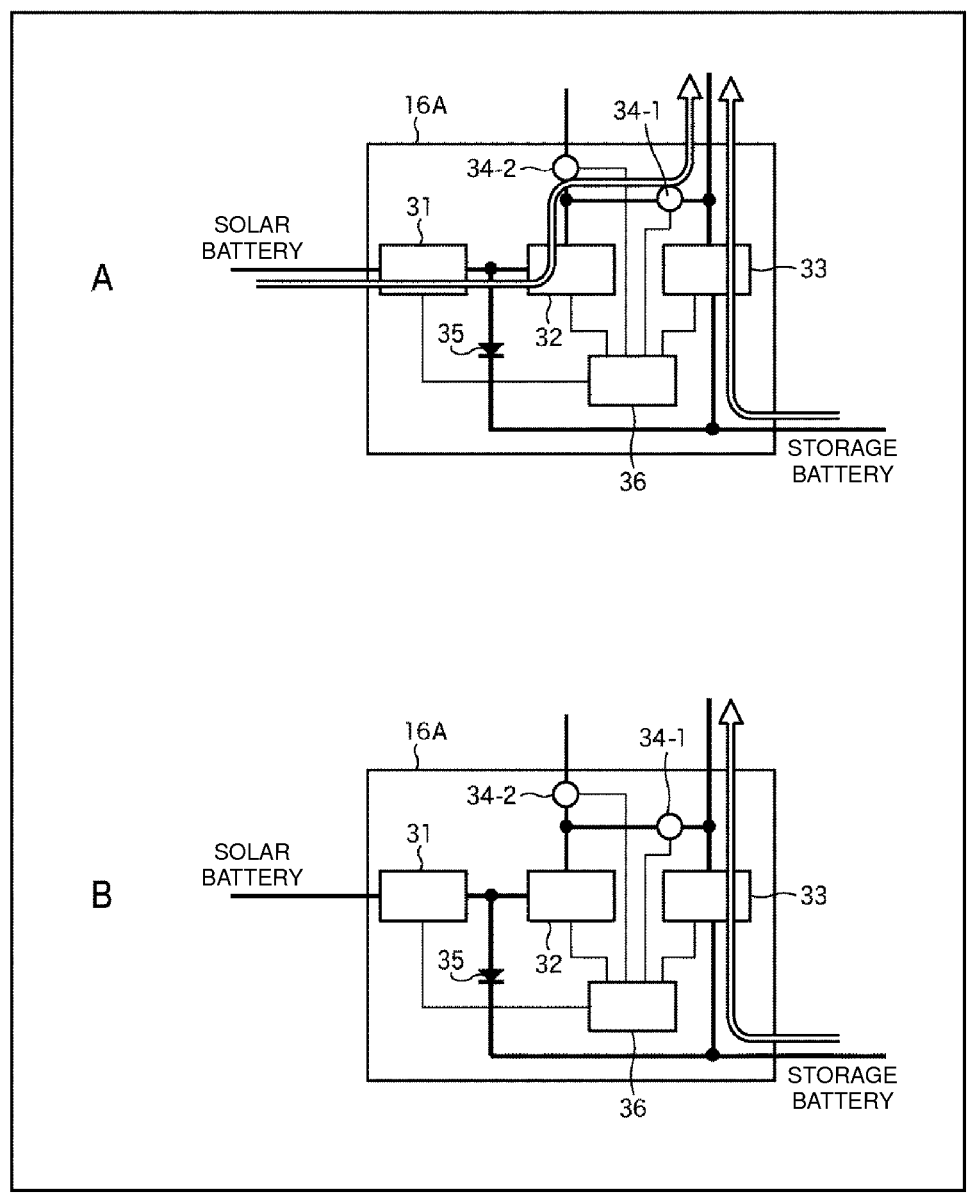
FIG. 4 is a diagram illustrating control by a control unit of FIG. 3.

For example, as shown in A of FIG. 4, when electric power generation is being performed in the photovoltaic panel 14, outputs of the PV-DCAC converting unit 32 and the bidirectional DCAC converting unit 33 are controlled such that the amount of current detected by the current detecting unit 34-2 is held 0. That is, in this case, when the amount of electric power generated by the photovoltaic panel 14 is about to fall below electric power consumption of each domestic load, control is performed so as to increase the output of the bidirectional DCAC converting unit 33.

Further, as shown in B of FIG. 4, when the electric power generation is not performed by the photovoltaic panel 14 (e.g., at midnight, or the like), the output of the bidirectional DCAC converting unit 33 is controlled such that the electric power consumption of each domestic load is covered by the electric power stored in the storage battery 15 in order to hold the amount of current detected by the current detecting unit 34-2 at 0.

As described, in the home electric power system 11 of FIG. 3, the control unit 36 controls each unit of the power conditioner 16 based on the amount of current detected by the current detecting unit 34-2, and it is thereby possible to stop flowing of the electric power from the electric power system, so as to prevent the electric power from being purchased. It is to be noted that, for example, the control unit 36 may perform control based on whether or not the amount of current from the electric power system has become not higher than a predefined amount of current which is close to 0 (whether or not it has gotten close to 0). In this case, although a small amount of electric power flows in from the electric power system, it is possible to more reliably prevent electric power from flowing out to the electric power system.

It is to be noted that the power conditioner 16 is not restricted to the use in the home electric power system provided with the photovoltaic panel 14, but is, for example, applicable to a home electric power system provided with a private electric generator such as a small-sized aerogenerator or a fuel cell, or a home electric power system provided with the storage battery 15 alone. That is, the present invention is applicable to a power conditioner that makes a distinction in electric power to adjust supplies of the electric power, even if the power conditioner belongs to a home electric power system provided with any power source, so long as the home electric power system is provided with a power source which generates electric power not required to be returned to the electric power system.

Figure 5:
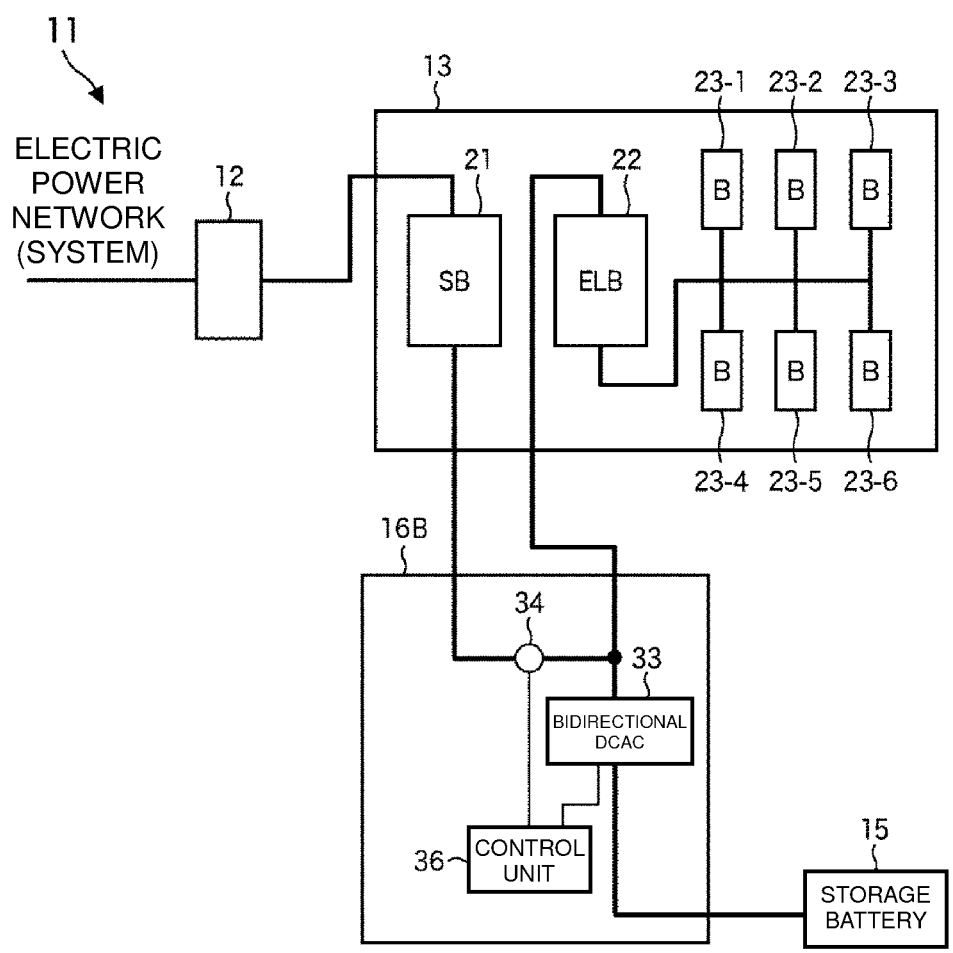
FIG. 5 is a block diagram showing an example of a configuration of a third embodiment of the home electric power system, to which the present invention has been applied.

FIG. 5 is a block diagram showing an example of a configuration of a third embodiment of the home electric power system, to which the present invention has been applied.

In the home electric power system 11 shown in FIG. 5, a power conditioner 16B is configured to include the bidirectional DCAC converting unit 33, the current detecting unit 34, and the control unit 36. In the power conditioner 16B, the amount of current flowing towards the earth leakage circuit breaker 22 from the safety breaker 21 is detected by the current detecting unit 34, and the control unit 36 adjusts an output of the bidirectional DCAC converting unit 33 in accordance with the amount of current. That is, the control unit 36 performs control such that there is no the current flowing towards the safety breaker 21 in accordance with the amount of current from the current detecting unit 34. This leads to prevention of electric power stored in the storage battery 15 from flowing out to the electric power system via the safety breaker 21 and the meter 12.

It should be noted that, the present invention is applicable, for example, to a home electric power system provided with a PV control unit with respect to each of a plurality of PV modules constituting the photovoltaic panel 14, besides the home electric power system 11 where the PV control unit 31 provided in the power conditioner 16 as shown in FIG. 3 performs control of the photovoltaic panel 14. When the PV control unit is provided with respect to each of the plurality of PV modules constituting the photovoltaic panel 14 as described, it is possible to perform control such that a maximum output is made with respect to each of the PV modules, so as to obtain optimum output electric power in the photovoltaic panel 14 as a whole.

It is to be noted that, other than controlling the output of the bidirectional DCAC converting unit 33 to prevent the electric power stored in the storage battery 15 from flowing out to the electric power system, the control unit 36 may, for example, wire a relay in series with the current detecting unit 34 and switch the relay based on the amount of current detected by the current detecting unit 34 and the electric power consumption by each domestic load or the like, thereby to prevent the electric power stored in the storage battery 15 from flowing out to the electric power system. Further, a relay may be provided in place of the diode 35 to regulate the supply of electric power between the PV control unit 31 and the storage battery 15.

Moreover, the control unit 36 is configured to include a CPU (Central Processing Unit), a ROM (Read Only Memory), a RAM (Random Access Memory), a flash memory, (e.g., EEPROM (Electronically Erasable and Programmable Read Only Memory)), and the like, and a program stored in the ROM or the flash memory is loaded to the RAM and executed, thereby to control each unit of the power conditioner 16. It should be noted that a program to be executed by the CPU, other than the programs previously stored in the ROM and the flash memory, can be downloaded to the flash memory and updated as appropriate.

It is to be noted that the embodiment of the present invention is not restricted to the foregoing embodiments, and a variety of changes are possible in the range not deviating from the gist of the present invention. Further, although the home electric power system was described in the foregoing embodiments, the present invention is applicable to the electric power system such as a factory and an office, and a place where it is applied is any place.

DESCRIPTION OF SYMBOLS 11 home electric power system
12 meter
13 distribution board
14 photovoltaic panel
15 storage battery
16, 16A, 16B power conditioner
21 safety breaker
22 earth leakage circuit breaker
31 PV control unit
32 PV-DCAC converting unit
33 bidirectional DCAC converting unit
34 current detecting unit
35 diode
36 control unit

The invention claimed is:
1. A control apparatus, comprising:
   a first electric power converting unit configured to convert DC power to AC power and output the converted power to each load;
   a second electric power converting unit configured to convert DC power to AC power;
   a first current detecting unit configured to detect a current flowing through a wire that connects a wire between an electric power system and the second electric power converting unit with a wire between the first electric power converting unit and the each load; and
   a control unit configured to control a supply of the electric power from the first electric power converting unit to the each load based on an amount of current detected by the first current detecting unit;
   wherein the second electric power converting unit is connected to the electric power system, and to the wire between the first electric power converting unit and the each load via the first current detecting unit.
2. The control apparatus according to claim 1, wherein the control unit increases/reduces an amount of AC power output of the first electric power converting unit to control the supply of the electric power to the each load.

3. The control apparatus according to claim 1 or 2, wherein
the control unit performs control of reducing an amount of AC power output of the first electric power converting unit when it is detected by the first current detecting unit that a current flowing to the each load from the electric power system has become not larger than a predefined amount of current.

4. The control apparatus according to claim 1, further comprising
a regulation unit configured to supply an electric power from a power source that supplies the electric power toward the second electric power converting unit, to a storage unit configured to store the electric power, and the regulation unit being further configured to prevent flowing of the electric power from the storage unit into the second electric power converting unit.

5. The control apparatus according to claim 1, further comprising
a second current detecting unit, arranged closer to the electric power system than a connection point, the connection point being a point in which a wire where the first current detecting unit is provided is connected to the wire between the electric power system and the second electric power converting unit; wherein
the control unit controls the supply of the electric power to the each load based on an amount of current detected by the second electric power converting unit.

6. The control apparatus according to claim 1, wherein
the first electric power converting unit converts an electric power from a power source not required to return the electric power to the electric power system, and the second electric power converting unit converts an electric power from a power source required to return the electric power to the electric power system.

7. The control apparatus according to claim 6, wherein
the first electric power converting unit is connected to a storage unit configured to store the electric power, and the second electric power converting unit is connected to a photovoltaic power generator configured to perform electric power generation in accordance with irradiation with sunlight.

8. A control method for a control apparatus which adjusts a supply of electric power in an electric power system, the method comprising:
- converting DC power to AC power and outputting the converted power to each load using a first electric power converting unit;
- converting DC power to AC power using a second electric power converting unit;
- a detecting, using a current detecting unit, a current flowing through a wire that connects a wire between the electric power system and the second electric power converting unit with a wire between the first electric power converting unit and the each load; and
- controlling, using a control unit, a supply of the electric power from the first electric power converting unit to the each load based on the amount of current detected by the current detecting unit;
- wherein the second electric power converting unit is connected to the electric power system, and to the wire between the first electric power converting unit and the each load via the current detecting unit.

* * * * *